United States Patent [19]

Stenkvist et al.

[11] 4,177,061

[45] Dec. 4, 1979

[54] METHOD FOR MAKING IRON-CHROMIUM ALLOYS

[75] Inventors: Sven-Einar Stenkvist; Björn Widell, both of Vesteras, Sweden

[73] Assignee: ASEA Aktiebolag, Vesteras, Sweden

[21] Appl. No.: 913,040

[22] Filed: Jun. 7, 1978

[30] Foreign Application Priority Data

Jun. 9, 1977 [SE] Sweden ................................ 7706700

[51] Int. Cl.² ............................................. C21C 5/52
[52] U.S. Cl. ........................................ 75/11; 13/9 R
[58] Field of Search ...................... 75/10–12, 75/130.5

[56] References Cited

U.S. PATENT DOCUMENTS

| | | | |
|---|---|---|---|
| 2,303,973 | 1/1942 | Armstrong | 75/10 R |
| 3,158,464 | 11/1964 | Chynoweth | 75/130.5 |
| 3,940,551 | 2/1976 | Ling | 75/11 |

*Primary Examiner*—P. D. Rosenberg
*Attorney, Agent, or Firm*—Kenyon & Kenyon

[57] ABSTRACT

Iron-chromium alloys, such as stainless steels, are made in a direct arc DC electric arc furnace with a bath of molten steel scrap in the hearth and functioning as the anode with the arcing electrode cathodic, while feeding chromium-oxide to the bath at the arc spot on the bath's surface under conditions causing reduction of the oxide and addition of chromium to the bath.

4 Claims, 2 Drawing Figures

METHOD FOR MAKING IRON-CHROMIUM ALLOYS

BACKGROUND OF THE INVENTION

Iron-chromium alloys of substantial chromium content, such as stainless steel containing 12% or more chromium, are commonly made in a direct-arc electric arc furnace.

Steel scrap is charged in the furnace hearth, the arc is struck and as soon as the arc is below the top scrap level, melt-down of the scrap is initiated under the maximum useful electric power. The scrap rapidly proceeds to melt, but as soon as melt-down proceeds to a degree where the arc energy is no longer adequately absorbed by unmelted scrap, power must be reduced to prevent the arc radiation from causing rapid deterioration of the furnace side wall and roof. After melt-down, ferro-chromium is added to the melt to obtain the required chromium content.

It is desirable to obtain a faster melt-down and eliminate the need for ferro-chromium which is a relatively expensive additive.

The cost of making such alloys would be reduced if the melt-down could proceed at a faster rate and the use of ferro-chromium eliminated.

SUMMARY OF THE INVENTION

To practice the present invention, a direct-arc DC electric arc furnace is used, having at least one consumable arcing electrode which is tubular or otherwise formed with an axial passage through which granular or powdered material can be fed, the furnace having a hearth, side wall and a roof through which the electrode depends and which encloses the furnace so that it can contain a non-oxidizing atmosphere. The DC power connections are made so that a charge in the hearth is anodic and the arcing electrode is cathodic. One example of such a furnace is shown by the Ling et al U.S. Pat. No. 3,940,551, excepting that it is not necessary to use the refractory feeding tube shown by this patent as extending through the axial passage of the arcing electrode, direct feeding through the passage being adequate.

Otherwise, the furnace construction may be conventional, the roof being removable and the furnace wall having the usual charging and tapping openings. etc. However, being a DC arc furnace, an anodically powered, retractable starting electrode and melt connection are required, as shown by the Stenkvist U.S. Pat. No. 3,999,000.

To practice the method of the present invention, steel scrap, by either top-charging or door-charging, is piled on the furnace hearth, the starting electrode is advanced into contact with the scrap pile, and the arcing electrode is manipulated to strike an arc with the top of the scrap pile. The BC electric power supplied at this time is reduced because the scrap does not yet absorb the arc energy by acting as a shield between the arc and the furnace side wall and roof.

As soon as the electrode tip and arc bores downwardly into the scrap pile, full arcing power is applied, the scrap now shielding the furnace wall and roof. When a bath of melt forms in the hearth, adequate to make the melt connection effective, the starting electrode can be retracted as explained by the Stenkvist patent. When the melt-down has reached a point where the scrap pile can no longer provide a shield, as previously noted, it has heretofore been necessary to reduce the arcing power to prevent rapid deterioration of the furnace side wall and roof.

However, at about that time or possibly shortly before, chromium oxide, preferably chromium ore, in particle or powder form, is fed through the arcing electrode's axial passage into the arc and on the arc spot formed at the foot of the arc on the melt, so that the oxide is reduced and chromium is added to the melting or melted scrap. This is an endothermic reaction, absorbs a substantial amount of the arc energy, and permits the full power operation to be continued much longer than has heretofore been possible. If more scrap must be charged to meet the hearth capacity, the described procedure is repeated.

In the above way, chromium can be added to the melt formed by the scrap in the furnace hearth, without the need for ferro-chromium, and melt-down proceeds at a maximized rate. After melt-down, the arcing power can be adjusted as required to work the melt in the usual manner. If the desired chromium content has not been obtained during the melt-down procedure, it can be increased as required by continued feeding of the chromium-oxide as required.

During the feeding of the chromium-oxide material, carbon is required for the reduction of the oxide. For this steel scrap may not inherently provide the carbon required, but this requirement can be met, for example, by feeding carbonaceous material with the chromium oxide. The furnace atmosphere should be maintained non-oxidizing with respect to the chromium.

DESCRIPTION OF THE DRAWINGS

The accompanying drawings are schematic and show only what is necessary to describe the method of this invention, the various figures being as follows.

DETAILED DESCRIPTION OF THE INVENTION

Figure 1:
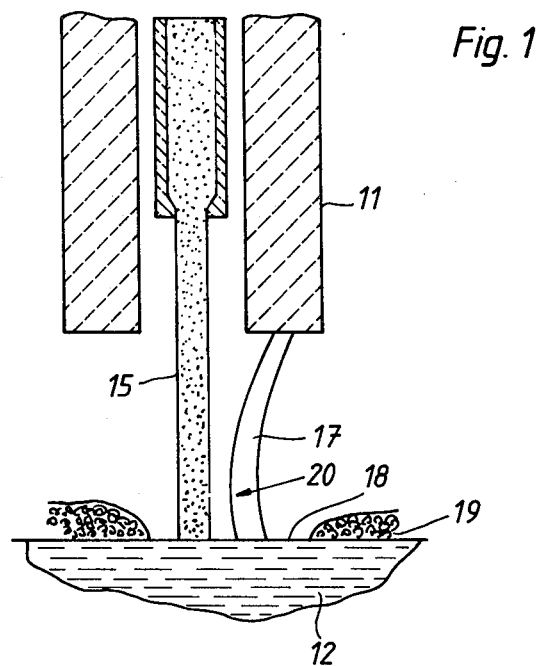
FIG. 1 is a vertical section showing the tip of the feeding or tubular consumable electrode feeding the chromium-oxide to the arc spot formed on the bath of melted scrap by the arc between the electrode tip and the bath.
Figure 2:
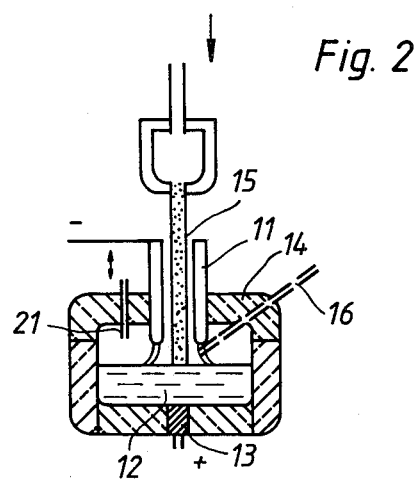
FIG. 2 in vertical section shows a direct arc DC electric arc furnace of the type previously suggested.

Having reference to the above drawings, the tubular arcing electrode 11 is illustrated with its bottom end or tip above a bath 12 of melted scrap connected anodically via the melt connection 13, the arcing electrode 11, connected cathodically, depending in the usual vertically movable manner through the furnace's removable top 14. The electrode 11 is of the consumable type made of carbon or graphite, possibly of the Soderberg type. The feed of chromium-oxide, which would normally be particulated or powdered chromium ore, possibly concentrated by a pretreatment, is shown at 15 as feeding downwardly through the axial inside passage of the tubular electrode 11. Possibly the electrode 11 can be a solid electrode in which case the feed of chromium-oxide can be provided via a water-cooled lance 16. The arc is shown at 17 as forming the arc spot 18 on the top surface of the bath 12, the arcing power maintaining this spot cleaned from slag and possibly coke 19, floating on the top of the bath. In FIG. 1 the arrow 20 indicates the direction of feed in case the lance 16 is used instead of a feeding arcing electrode, and in FIG. 2, 21 indicates the retractable starting electrode which can be electrically connected in parallel with the melt connection 13, as described by the previously referred to Stenkvist patent. Also as shown by that patent, the melt connection 13 can be laterally offset and, if desired, electromagnets (not shown) can be arranged beneath the bottom or hearth of the furnace, around its side wall or in the roof, to control the direction of the arc 17 or to cause it to rotate.

In addition to the roof 14 being removable to permit top-charging of the scrap, although not illustrated, the furnace side wall could be provided with a charging door for door-charging, and deslagging and tapping openings would normally be included so that by tilting in one direction or another deslagging and tapping can be effected, it being assumed that the furnace is a tilting furnace as usual. More than one arcing electrode could be used and the inner feeding tube unnumbered but shown in FIG. 1 (for which see the Ling et al patent), can be used or not, feeding directly through the arcing electrode 11 being practical as suggested by the Robinson U.S. Pat. No. 3,101,385 in the case of an AC electric arc furnace. In this patent a tubular arcing electrode is provided with axially extending gas passages through which a monatomic gas is injected into the arc while additive ores, possibly for alloying purposes, are fed through the electrode's inside, the gas producing a substantial increase in temperature of the arc zone.

In the present case the furnace, being adequately enclosed, should contain an atmosphere that is inert or at least non-oxidizing with respect to the chromium to be added to the bath, but this atmosphere may be effected and maintained in any prior art manner as is done usually when making a high chromium steel in an electric furnace.

As previously summarized, the present invention is practiced by either top-charging or door-charging the furnace with steel scrap which may be of conventional plain carbon steel and which is piled on the bottom or hearth of the furnace. The starting electrode 21 is pressed into contact with the scrap pile, the electrode 11 is manipulated and under reduced DC power the arc 17 is initially struck with the top of the scrap pile. The piled scrap is not illustrated but its appearance is well known. At this time the arc is formed between the bottom or tip of the arcing electrode and only the top of the scrap pile, the furnace wall and roof being unprotected against arc flare.

Soon the electrode tip and arc bore down into the pile of scrap so that the scrap surrounds the arc 17. At this time the full effective arc power is turned on so that the scrap melt-down can proceed at a rapid rate. In due time, a bath of the melting scrap makes the melt connection 13 effective, the anodic current commutating from the starting electrode 21 to this melt connection 13 and permitting retraction of the starting electrode, as described by the Stenkvist patent.

With the scrap pile rapidly melting, there is no longer sufficient scrap to form a shield between the arc 17 and the furnace side wall and roof and with the arc now operating at full power, rapid deterioration of the linings of these furnace parts would normally occur unless the arc power was reduced in accordance with the prior art practice.

It is at this time that the feed of chromium-oxide, such as chromium ore, possibly concentrated, in the form of particles or powder, should be started, although it could have been started earlier. Preferably the feed includes particulated or powdered carbonaceous material such as carbon or coke, or carbon could be otherwise added to the bath as by a coke bed floating on the bath and kept clear from the arc spot by the arc power. The chromium-oxide is quickly reduced and because this involves an endothermic action, the arc energy is very substantially absorbed so that the furnace wall and roof are not subjected to rapid deterioration even though no longer shielded by scrap around the arc.

With the prior art practice, as soon as the arc energy absorption or shielding provided by the scrap is lost, full arcing power can be maintained for only about some fifteen to thirty minutes, after which there must be a power reduction, obtained by lowering the voltage applied to the arc. With the addition of the chromium-oxide feed to the arc and, therefore, to the arc post 18 formed on the bath resulting as soon as the melt-down proceeds adequately, full arcing power may be extended for a substantially longer time. A large amount of thermal energy is consumed by the endothermic reaction occurring in the arc and bath. The melt-down is obtained in a substantially reduced time period so that further working of the melt can proceed.

At the same time, the chromium required by high chromium steel alloys such as various stainless grades, is added to the melt without the use of ferro-chromium. After melt-down, additional chromium can be added by feeding more chromium ore or the like while supplying the carbon required for the melt reduction of the chromium oxide. If one or more furnace charging procedures are required to provide an adequate melt, the described melting procedure is repeated in each instance and in each case a more rapid melt-down is possible together with the addition of chromium.

Although the chromium-oxide can be fed through either a tubular consumable electrode or via the water-cooled lance, in either case the feed should be directed to the arc or the arc spot 18 formed at the foot of the arc and where the bath is cleared by the arc power. It should be fed as soon as the scrape pile reduces to a degree where the scrap can no longer adequately absorb the arc energy or shield the arc flare from the furnace lining parts, if full arcing power is to be maintained. The chromium-oxide feed can be maintained after melt-down, for the purpose of adding chromium to the bath.

What is claimed is:

1. A method for making an iron-chromium alloy in an electric arc furnace having a hearth, side wall and arcing electrode; said method comprising charging the furnace with carbon-containing steel scrap so as to form a pile of the scrap on the hearth, applying DC power to the electrode and pile with the electrode cathodic and the pile anodic and forming an arc between the electrode's tip and the pile to start melting the scrap with the arc initially between said tip and the top of the pile and with melting of the scrap the arc and tip boring down into the pile with the scrap surrounding the arc and forming a shield absorbing the radiated arc energy so as to protect the furnace's side wall from said energy, said arc forming an arc spot on the forming melt resulting from said melting and said power being adjusted to a high value causing the arc to rapidly melt the scrap after said shield is formed and until a time when said shield ultimately is reduced to ineffectiveness by continued melting of the scrap, and not later than when said time occurs continuing said power at said high value while protecting the furnace's side wall by absorbing the arc energy by continuously feeding particulated chromium oxide to said arc spot so as to reduce said oxide by endothermic reaction with carbon contained by the melt via the scrap's carbon and so as to add chromium to the melt to form said alloy.

2. The method of claim 1 in which carbonaceous material is continuously fed to said melt during said chromium oxide feeding.

3. The method of claim 1 in which said particulated chromium oxide is fed through a conduit directly into said arc spot.

4. The method of claim 3 in which said electrode internally forms said conduit.

* * * * *